J. E. POWERS.
COMBINATION ELECTRIC SWITCH.
APPLICATION FILED JAN. 8, 1917.

1,250,502.

Patented Dec. 18, 1917.

INVENTOR
John E. Powers
by Geyer & Topp
ATTORNEYS.

UNITED STATES PATENT OFFICE.

JOHN E. POWERS, OF PIKE, NEW YORK.

COMBINATION ELECTRIC SWITCH.

1,250,502.  Specification of Letters Patent.  Patented Dec. 18, 1917.

Application filed January 8, 1917. Serial No. 141,141.

*To all whom it may concern:*

Be it known that I, JOHN E. POWERS, a citizen of the United States, residing at Pike, in the county of Wyoming and State of New York, have invented new and useful Improvements in Combination Electric Switches, of which the following is a specification.

This invention relates to a combination electric switch which is more particularly designed for use in connection with automobiles or other vehicles or machines which depend for their operation upon the closing of an electric circuit and the purpose of this invention is to provide a switch of this character which is simple and inexpensive in construction, easily operable and capable of being readily shifted into such a position that the desired electric circuit is closed and also shifted into such a position that this circuit is opened and cannot ordinarily be closed by any person other than one familiar with the particular combination of the switch.

Figure 1:
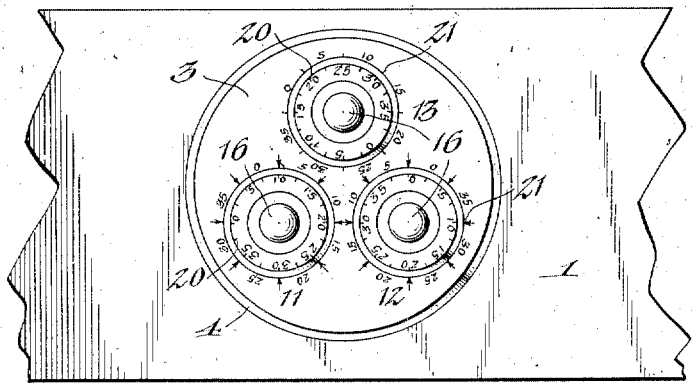
Figure 2:
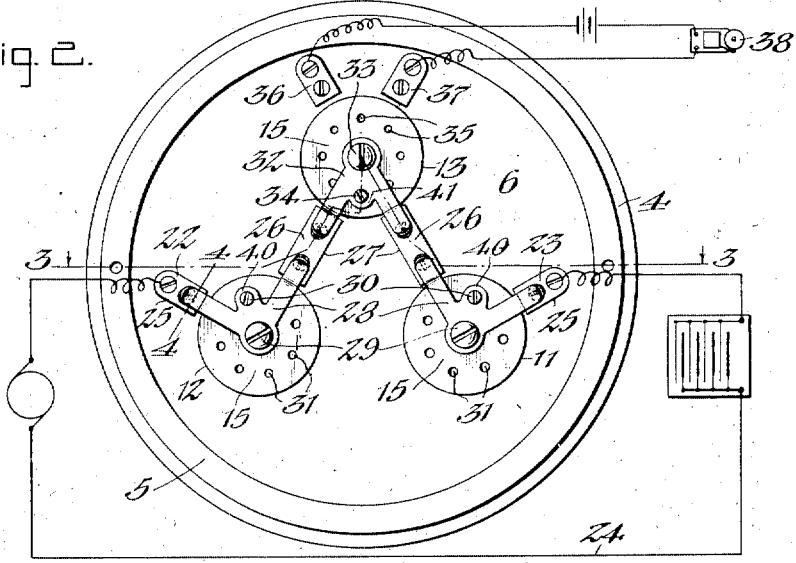
Figure 3:
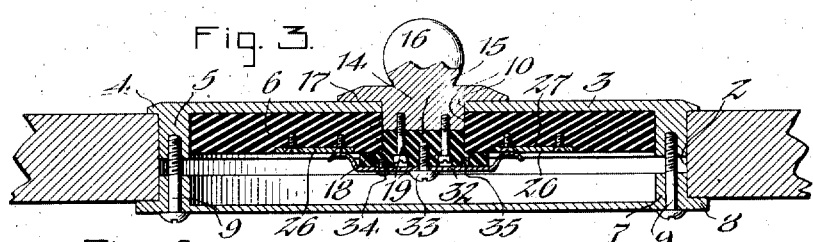
Figure 4:
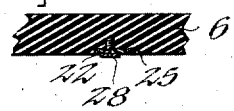

In the accompanying drawings: Figure 1 is a front elevation of a dash board of an automobile equipped with one form of combination electrical switch embodying my invention. Fig. 2 is a rear elevation of the same, on an enlarged scale, associated with an operating circuit and an auxiliary or alarm circuit. Fig. 3 is a cross section taken on the correspondingly numbered line in Fig. 2. Fig. 4 is a fragmentary cross section on line 4—4, Fig. 2.

Similar characters of reference indicate corresponding parts throughout the several views.

1 represents a wall or board upon which my improved combination electric switch is mounted and which may be the dash board of a motor vehicle or other part. In this board is formed an opening 2 which is preferably of circular form. Within this opening is arranged the support of the combination electric switch which in this instance comprises a circular metallic frame composed of a front face plate 3 provided with an annular shoulder or rim 4 adapted to bear against the front side of the dash board and an annular flange 5 projecting rearwardly from the face plate and engaging with the bore of the dash board opening, and a non-metallic or electric insulating plate 6 of rubber, fiber or similar material arranged in rear of the face plate and preferably within the annular flange thereof, as shown in Figs. 2 and 3. This switch support may be secured in the opening of the dash board in any suitable manner, for instance, by means of a clamping plate 7 of metal engaging with the rear part of the bore of the opening of the dash board and provided with an annular rim 8 engaging with the rear side of the dash board, and a plurality of clamping bolts or screws 9 which connect the flange of the supporting frame and the clamping plate, these screws being accessible only from the rear side of the dash board so as to prevent ready access to the same and thereby avoid easy tampering with the switch.

The switch support is provided with one or more bearings 10, three of such bearings being preferably provided and being arranged partly in the metallic face plate and partly in the insulating plate of the support equi-distant around the axis of the same. Within these bearings are journaled or pivotally mounted a plurality of rotatable tumblers 11, 12, 13 each of which preferably comprises a metallic front section 14 which is journaled in the front part of its respective bearing and an insulating rear section 15 which is constructed of fiber, rubber or similar material and journaled in the rear part of the same bearing. The front metal section of each tumbler is provided with a forwardly projecting handle or finger-piece 16 whereby the same may be turned or manipulated and an annular rim 17 which engages with the front side of the face plate. The insulating rear section of each tumbler is provided with an annular flange 18 bearing against the rear side of the insulating plate and the sections of each tumbler are preferably connected by means of screws 19 arranged on opposite sides of the axis thereof and entering these parts from the rear end of the tumbler, whereby the same are held in an assembled position and access to the connecting screws 19 is rendered difficult so that the tampering with the same is not readily permissible. By this connection between the front and rear sections of each tumbler the same are free to rotate but they are held against axial movement in the respective bearing of the switch support.

The front rim of each tumbler is preferably provided with an annular row of indicating marks 20 such as numbers or graduations which are adapted to be moved relative to similar indicating marks 21 on the face plate for the purpose of permitting turning this tumbler to a predetermined position for effecting a closing of the main electric circuit which is to be controlled by this switch. In the preferred arrangement of the tumblers two of them are arranged horizontally in line on the lower part of the face plate and insulating plate and these will hereafter be referred to, for convenience, as the end tumblers, while the third tumbler is arranged centrally on the upper part of said support and will be hereafter referred to as the intermediate tumbler.

22, 23 represent two fixed end contacts which are mounted on the rear side of the insulating plate and form the terminals of a main electric circuit 24 which is to be controlled by this switch. Each of these fixed end contacts is associated with one of the end tumblers and seated in a recess 25 in the supporting plate, adjacent to the periphery of the respective tumbler so that the rear sides or surfaces of this plate and fixed end contact are flush, as shown in Figs. 2 and 4. 26, 26 represent two intermediate fixed contacts each of which is arranged between the peripheral portion of one of the end tumblers and the adjacent part of the intermediate tumbler and secured in a recess 27 in the rear side of the insulating plate so that these parts are flush, as shown in Figs. 2 and 3. The end and intermediate fixed contacts associated with each end tumbler are arranged at different points circumferentially relatively to the respective tumbler, and the two intermediate fixed contacts are in like manner arranged at different points circumferentially relatively to the intermediate tumbler on the insulating plate.

28, 28 represent two movable end contacts each of which is mounted on one of the endmost tumblers so as to be compelled to turn therewith. Each of these movable end contacts is preferably of angular or of V-shaped form and pivotally mounted at its angle to the rear side of the rear section of the respective tumbler by means of a screw 29 arranged axially on this tumbler section. The arms of each of these movable end contacts project laterally beyond the periphery of the respective tumbler and are adapted to rotate in contact with the rear sides of the insulating plate and the companion end and intermediate fixed contacts. The angle between the arms of each movable end contact is the same as the angle between the companion end and intermediate fixed contacts associated with the respective tumbler so that upon turning the latter into a definite or predetermined position the arms of this movable contact will engage the fixed end and intermediate contacts referred to and form a closure at these particular places of the electric circuit of which these members form a part. But when this tumbler is turned together with its movable contact so as to bring the arms of the latter out of engagement from the fixed and intermediate end contacts associated therewith then this electric circuit will be broken at these points and the mechanism associated with this circuit becomes inoperative. In order to permit of varying the position of this V-shaped or angular movable contact in a circumferential direction relative to the tumbler on which the same is mounted an adjusting device is provided which preferably consists of an adjusting screw 30 passing through an opening in a lug 40 on the respective V-shaped movable contact and entering one of an annular row of openings 31 formed in the rear end of the respective tumbler, as shown in Figs. 2 and 3. A V-shaped or angular contact 32 is in like manner pivoted at its angle by means of a screw 33 on the center of the rear end of the intermediate tumbler and retained in different positions relatively to the circumference of this last mentioned tumbler by means of an adjusting screw 34 passing through an opening in a lug 41 on this intermediate movable contact and into one of an annular row of openings 35 formed in the rear section of this intermediate tumbler. The arms of the movable contact mounted on the intermediate tumbler project laterally beyond the periphery of the same and are adapted to rotate in contact with the rear sides of the insulating plate and the adjacent parts of the fixed intermediate contacts. In one position of the intermediate tumbler the arms of its movable contact engage with both of the fixed intermediate contacts, thereby closing at this point the main electric circuit of which the same form parts, as shown in Figs. 2 and 3, but when this tumbler is turned so that the arms of its movable contact are out of engagement with the fixed intermediate contacts then this main circuit is broken at these points.

As shown in Fig. 2, the arms of the movable contacts of both end tumblers engage with the companion fixed end and intermediate contacts and the arms of the movable contact of the intermediate tumbler engage with both the intermediate fixed contacts whereby the main electric circuit of which these members form a part is closed. Upon turning any one or more of these tumblers so as to break the connection between one or more of the movable contacts and the companion fixed contacts then this main electric circuit will be broken. By noting the relative position of the indicating marks on the front section of each tumbler and the adjacent part of the face plate when the electric circuit is thus closed it is possible to easily restore the circuit after the same has been broken. By shifting one or more of the V-shaped contacts on the rear end of one or more of the tumblers and securing the same in this position by means of the adjusting or fastening screws 30, 34 it is possible to produce a variety of combination of positions in the switch which will enable only the person or persons familiar with this combination to quickly and easily close the main electric circuit and render it practically impossible for any one not acquainted with this combination to effect a closure of this circuit, thereby guarding against improper use of the devices with which this switch is associated, such for instance, as an automobile, motor boat or the like.

By mounting the fixed contacts flush with the surface of the insulated supporting plate no appreciable difference will be manifested when the arms of the V-shaped contacts are rotated upon turning the respective tumbler and it is therefore practically impossible for any one to determine the correct position in which this switch will be closed by the sense of touch as would be possible if a pronounced difference in action would occur when the arms of the movable contact engaged with the fixed contacts as compared with the engagement of these arms with the insulating plate.

In order to scare away any person who may attempt to tamper with this combination electric switch an alarm device is provided in connection with this switch which preferably comprises two auxiliary fixed metal contacts 36, 37 which are arranged on the rear side of the insulating plate adjacent to different parts of the periphery of the intermediate tumbler and connected in circuit with an electric bell 38 or other audible alarm device such as a horn. These auxiliary contacts are spaced apart a distance corresponding to the distance between the intermediate fixed contacts, so that when the intermediate tumbler is turned with the arms of its V-shaped contact into engagement with these auxiliary contacts then the alarm circuit will be closed and the resulting sound will in all probability frighten the party attempting to close the electric switch with a view of making improper use of the vehicle or other part with which the same is associated.

This combination electric switch can be produced at comparatively low cost, the same can be easily manipulated and it is possible by its use to effectively guard against theft or improper use of the apparatus on which the same is installed.

I claim as my invention:

A combination electric switch comprising a stationary support, a rotatable tumbler pivotally mounted on said support and provided with a plurality of openings arranged in a concentric row relatively to the axis of said tumbler, a fixed contact arranged on said support, a movable contact adapted to engage said fixed contact and pivoted on said tumbler concentrically with the axis thereof and provided with an opening on one side of said axis, and an adjusting screw passing through the opening in said movable contact and into one of the openings of said tumbler.

JOHN E. POWERS.